United States Patent
Lunney, II

[19]

[11] Patent Number: 5,971,446
[45] Date of Patent: Oct. 26, 1999

[54] TRUCK LID HINGE SYSTEM

[76] Inventor: William Gaylord Lunney, II, 6801 Paramount Blvd., Long Beach, Calif. 90805

[21] Appl. No.: 08/914,335

[22] Filed: Jul. 15, 1997

[51] Int. Cl.[6] ............................................. B60P 7/02
[52] U.S. Cl. ............................ 286/100.08; 296/100.06; 296/100.07; 296/100.08; 296/100.1
[58] Field of Search .................... 296/100.02, 100.06, 296/100.07, 100.08, 100.1

[56] References Cited

U.S. PATENT DOCUMENTS

| | | | |
|---|---|---|---|
| 2,912,276 | 11/1959 | Schwartz et al. | 296/100.06 |
| 2,989,340 | 6/1961 | Penner | 296/100.1 |
| 3,051,523 | 8/1962 | Boyce-Smith et al. | 296/100.07 |
| 3,489,456 | 1/1970 | Klanke | 296/100.07 |
| 3,762,762 | 10/1973 | Beveridge et al. | 296/100.07 |
| 3,785,698 | 1/1974 | Dean et al. | 296/100.07 |
| 4,079,989 | 3/1978 | Robertson | 296/100.07 |
| 4,101,162 | 7/1978 | Koehn | 296/100.1 |
| 4,124,247 | 11/1978 | Penner | 296/100.07 |
| 4,615,557 | 10/1986 | Robinson | 296/100.07 |
| 4,773,126 | 9/1988 | Voss | 296/100.08 |
| 5,018,777 | 5/1991 | Swenson et al. | 296/100.07 |
| 5,102,185 | 4/1992 | Lake | 296/100.07 |
| 5,104,175 | 4/1992 | Enninga | 296/100.1 |
| 5,228,739 | 7/1993 | Love | 296/100.02 |
| 5,322,336 | 6/1994 | Isler | 296/100.1 |
| 5,366,266 | 11/1994 | Harbison | 296/100.02 |
| 5,503,450 | 4/1996 | Miller | 296/100.08 |
| 5,595,418 | 1/1997 | Medlin | 296/100.08 |
| 5,632,522 | 5/1997 | Gaiten et al. | 296/100.06 |
| 5,743,586 | 4/1998 | Nett | 296/100.02 |

*Primary Examiner*—Joseph D. Pape
*Assistant Examiner*—Kiran Patel
*Attorney, Agent, or Firm*—Fulwider Patton Lee & Utecht, LLP

[57] ABSTRACT

A hinge system for removably connecting a lid to the bed of a truck without forming permanent holes in the truck. The hinge system includes mounting plates which support a pair of hinge units with the mounting plates being releasably attached to an existing vertical tuck bed flange by a clamping mechanism. The hinge units permit the rear end of the lid to be raised relative to the front of the truck bed.

6 Claims, 4 Drawing Sheets

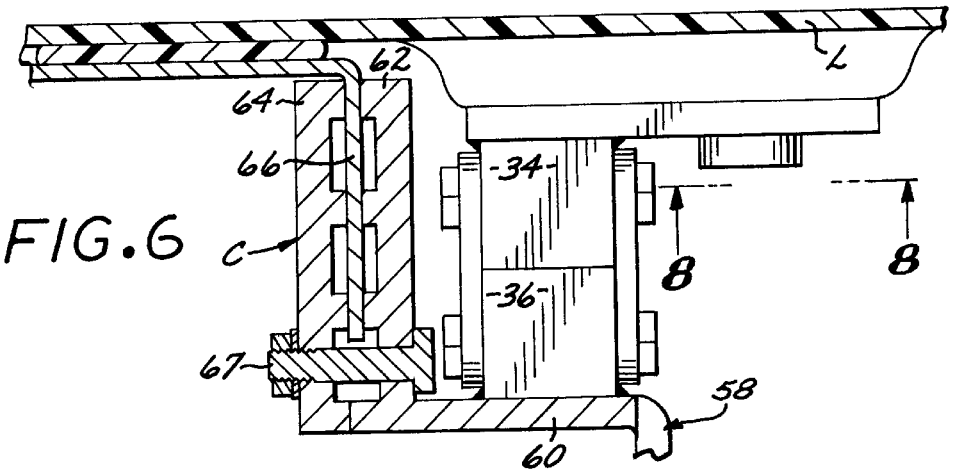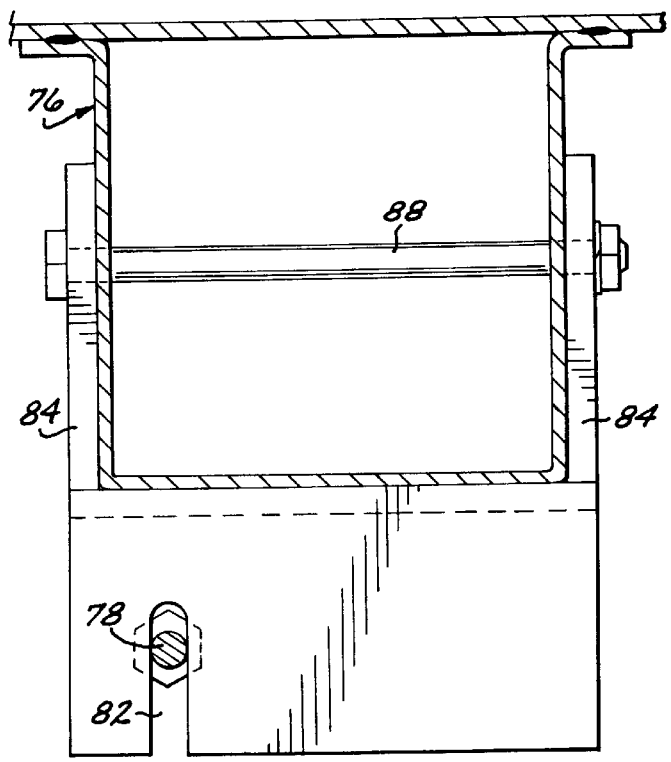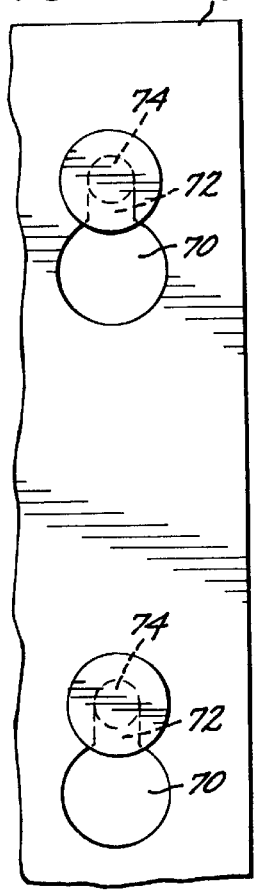

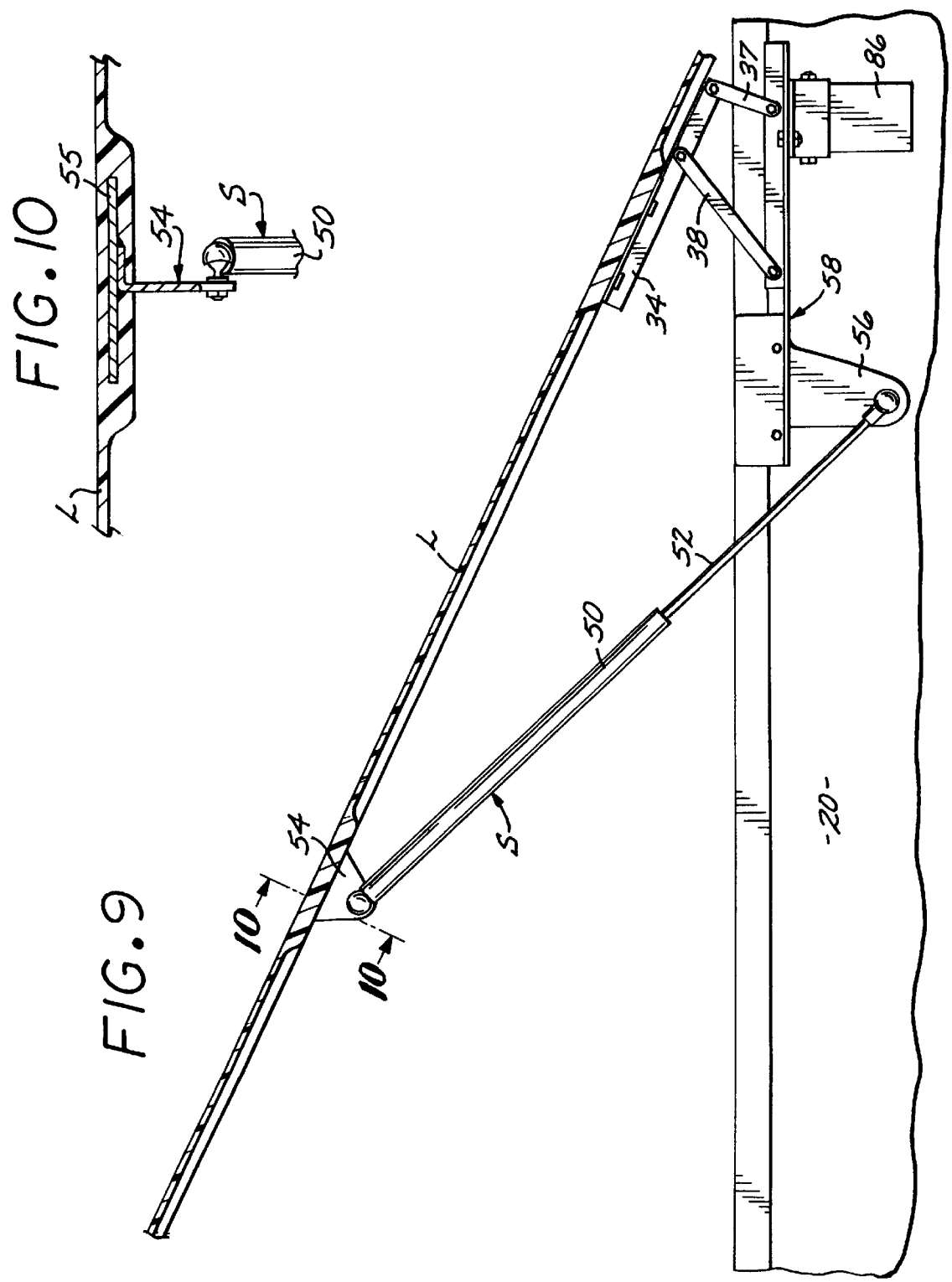

TRUCK LID HINGE SYSTEM

BACKGROUND OF THE INVENTION

The present invention relates to lids for covering the bed of a pick-up truck.

There are presently available lids which are attached to a pick-up truck for covering the bed thereof. Such lids are generally formed of fibreglass or synthetic plastic and are hingedly connected to the rear portion of a truck by a hinge mechanism which permits the free end of the lid to be raised to provide access to the truck bed. Conventional truck bed lid hinges are affixed to the truck by bolt and nut connections and it is necessary to form holes in the truck bed area to receive such connections. In many instances, pick-up truck owners are reluctant to drill such mounting holes, since the holes remain when the truck owner decides to dispense with the lid. Additionally, it is necessary to precisely locate such bolt mounting holes and accordingly, many truck owners are reluctant to drill such holes and instead take their trucks to professional installers, which raises the cost of utilizing such truck lids. Where a truck is leased, the lease may preclude drilling of permanent holes in the truck bed area. Similarly, where a pick-up truck owner seeks to trade-in his truck, the dealer will typically deduct a certain amount from the truck's trade in value because of the presence of the permanent holes. Moreover, the normal warranty requires that the truck owner not make any permanent holes in the truck bed area.

With conventional truck lids the lid is releasably supported in a raised position by means of a pair of gas springs which act as lid lifter shock members. The gas springs extend from the truck lid upwardly and forwardly relative to the truck bed. This positioning of the gas springs inhibits access to the interior of the truck bed, as compared to the truck lid hinge system of the present invention wherein the gas springs extend rearwardly and upwardly from the truck bed.

SUMMARY OF THE INVENTION

The track lid hinge system of the present invention overcomes the disadvantages of conventional track lid hinge systems set forth hereinabove. Specifically, the truck lid hinge system of the present invention eliminates the necessity of drilling holes in the bed of the truck by providing a clamping mechanism for removably securing the hinge system to the truck bed. Additionally, with the truck hinge system of the present invention easier access to the interior of the truck bed is provided as compared to prior truck lid hinge systems.

The truck hinge system of the present invention permits easy installation and removal of the lid on a truck bed by a truck owner. Additionally, the truck lid hinge system of the present invention permits installation of lids on trucks having varying bed dimensions.

These and other objects of the present invention will become apparent from the following detailed description when taken into conjunction with the appended drawings.

BRIEF DESCRIPTION OF THE DRAWINGS

FIG. 6 is a vertical sectional view taken in further enlarged scale along line 6—6 of FIG. 3.

FIG. 7 is a horizonal sectional view taken in further enlarged scale along line 7—7 of FIG. 3.

FIG. 8 is a horizontal sectional view taken in further enlarged scale along line 8—8 of FIG. 6.

FIG. 9 is a side elevational view taken partly in vertical section similar to FIG. 4 showing the lid in its raised position.

FIG. 10 is an inclined sectional view taken in enlarged scale along line 10—10 of FIG. 9.

DETAILED DESCRIPTION OF A PREFERRED EMBODIMENT

Figure 1:
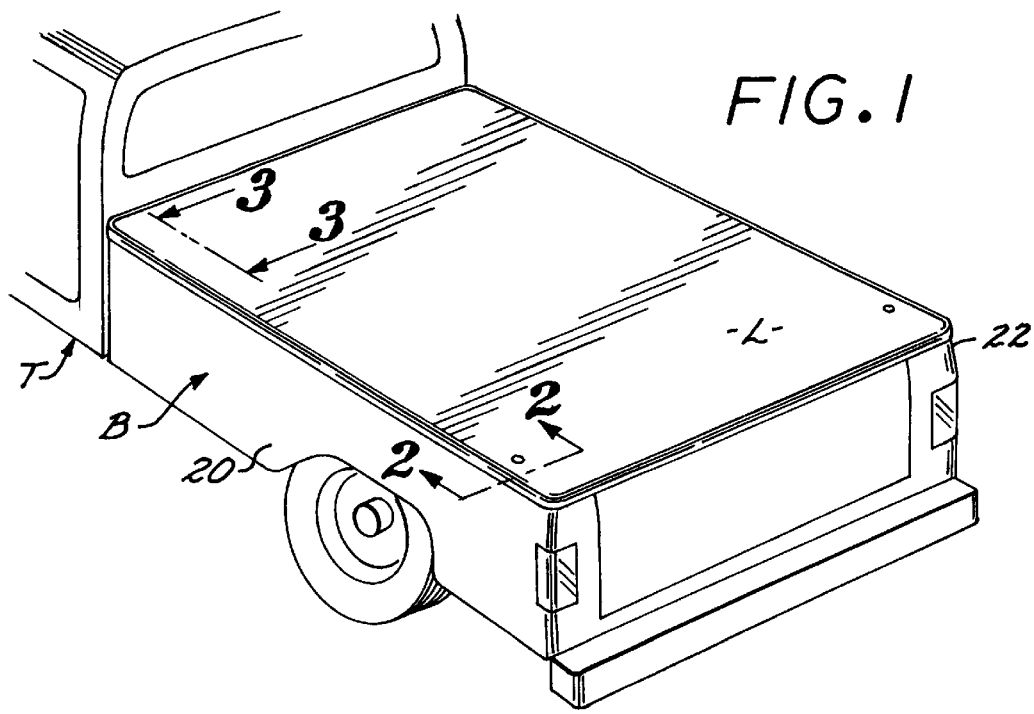
FIG. 1, is a perspective view showing a lid utilizing a hinge system embodying the present invention covering the bed of a truck with the lid in a closed position.

Referring to the drawings there is shown in FIG. 1 a pick-up truck T having a bed area B which is adapted to be covered by a lid L attached to the truck by means of a hinge system embodying the present invention. Truck bed B includes sidewalls 20 and 22 and a tailgate 24. It should be understood that the truck bed B is of conventional construction.

Figure 3:
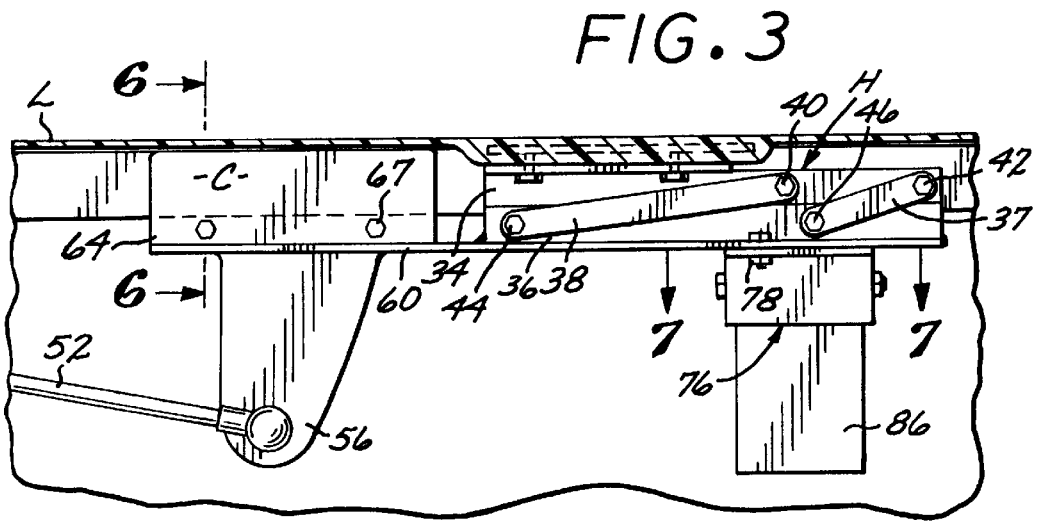
FIG. 3, is a vertical sectional view taken in enlarged scale along line 3—3 of FIG. 1.
Figure 4:
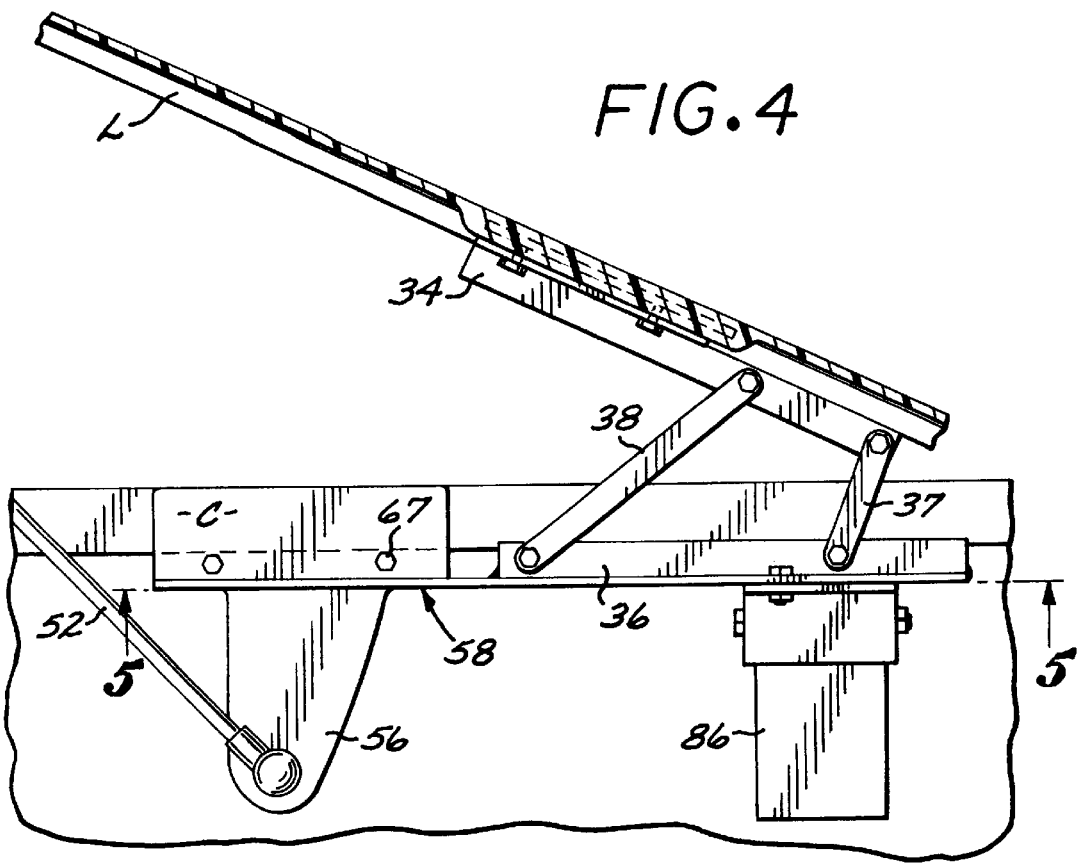
FIG. 4 is a vertical sectional view similar to FIG. 3 but showing the lid in its raised position.
Figure 5:
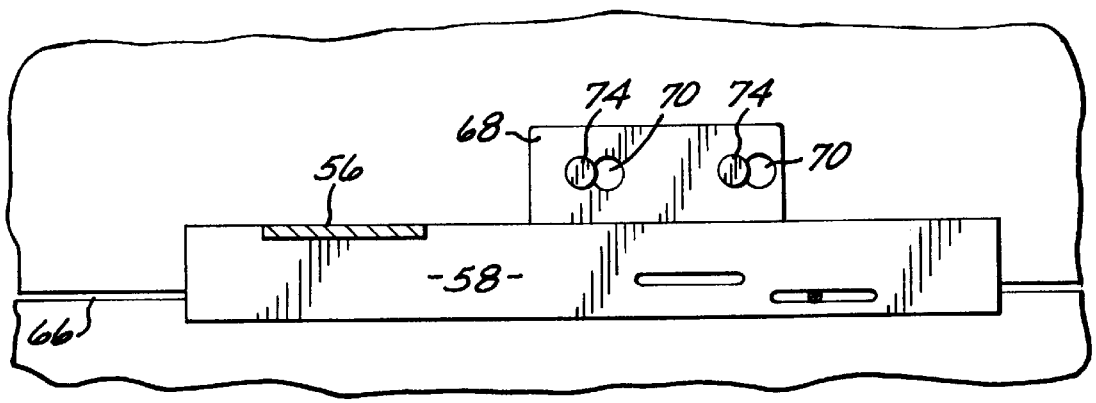
FIG. 5 is a horizontal sectional view taken in a further enlarged scale along line 5—5 of FIG. 4.

More particularly, referring to the remaining drawings, lid L may be of fibreglass or molded synthetic plastic construction. The front portion of lid L may be temporarily or permanently attached to the front portion of the truck bed B by a hinge system H embodying the present invention. Hinge system H includes a pair of like hinge units removably secured to opposite sides of the interior of truck B. Only one of such units is shown in the drawings. Each unit includes a pair of horizontally extending upper and lower support bars 34 and 36. The support bars 34 and 36 are interconnected for relative vertical movement by a pair of front hinge links 37 and rear hinge links 38, with the front hinge links being shorter than the rear hinge links. Attachment of the hinge links to the support bars is effected by means of upper and lower pivot bolts 40, 42, and 44, 46. As indicated in FIGS. 3 and 4, the hinge assembly permits the front of lid L to be raised relative to the truck bed from its position of FIGS. 1 to its position of FIG. 4. During such movement of the lid L, the front and rear links will pivot upwardly and rearwardly from their initial closed position of FIG. 3 to their open position of FIGS. 4 and 9.

Lid L is releasably supported in its raised position by means of a pair of left and right conventional gas springs S, which serve as lid lifter shocks (only one of which is shown in the drawings). Each gas spring shock includes a cylinder 50 from which coaxially slidably extends a strut 52. It should be understood that the gas springs S are of conventional construction of the type employed in prior hinged truck lid arrangements. The upper end of cylinder 50 is pivotally connected to lid L by a conventional gas spring shock mount 54 having its base 55 embedded in a thickened portion of the lid (FIG. 10) on the underside of the intermediate portion of lid L. A similar conventional gas spring shock mount 56 secures the lower end of strut 52 to mounting plate 58 of the hinge system.

Referring particularly to FIGS. 3 and 6, mounting plate 58 is of generally L-shaped configuration having a horizontal leg 60 integral with a vertical leg 62. Vertical leg 62 of mounting plate 58 cooperates with a vertical backing pad 64 to form a clamp C which is removably attached to a vertical flange 66 positioned at one side of the interior of a conventional truck bed. Clamping force is provided by plurality of bolt and nuts 67 that extend through vertical leg 62 and backing pad 64.

The top of support bar 36 is rigidly affixed to a horizontal plate 68 formed with a pair of holes 70 from the front end of which extend longitudinal adjustment slots 72 (FIGS. 6 and 8). Securement bolts 74 threadably carried by a thickened portion of lid L are inserted through holes 70 for reception by the adjustment slots to attach the rear portion of the lid L to the upper support bar 36.

A mounting box 76 is attached to horizontal leg 60 by bolt and nut assembly 78 that extends through a longitudinal adjustment slot 82. Box 76 includes ears 84 which straddle vertical stake bed pocket channel element 86 forming a part of the interior side portions of truck bed B. A bolt and nut assembly 88 connects the ears with the stake bed pocket channel 86. As noted hereinbefore a hinge unit which is a mirror image of the hinge unit described above is clamped to a vertical flange (no' shown) similar to vertical flange 66 formed on the opposite side of truck bed B.

Figure 2:
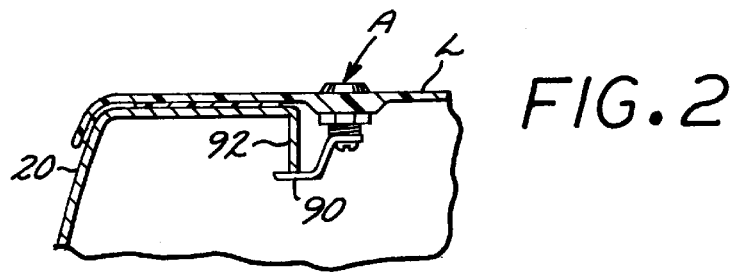
FIG. 2, is a horizontal sectional view taken in enlarged scale along line 2—2 of FIG. 1.

The lid L may be locked in its closed position by a pair of conventional key operated lock assembly's A, having a keeper 90 engageable with a flange 92 formed on the sides of the truck bed, as shown in FIG. 2.

From the foregoing description it will be seen that the truck lid hinge system embodying the present invention is easy to install on a track by a truck user, eliminating the cost of employing a professional installer. The hinge system is compact since it incorporates both the hinging mechanism and the lower shock mount in a unitary mounting member. The inclination of the gas springs afford ready access to the track bed when the lid is raised. Also, such inclination decreases the amount of effort required to raise the lid. The simple adjustability of the unit permits its installation on trucks of varying dimensions. Note that on some truck models, it may be desirable to untie a strut attachment to the stake bed pocket channel. With other truck models, additional hardware may be used to removable attach the hinge system to the truck bed. The major feature of the hinge system of the present invention is the elimination of the need to form attachment holes in a truck bed to secure the lid to such truck bed.

Various modifications and changes may be made with respect to the foregoing description without departing from the spirit of such invention.

I claim:

1. A hinge system for removably connecting a lid to the bed of a truck, such bed including a pair of vertical flanges disposed at opposite front sides of the interior of the truck bed, the hinge system including a pair of like hinge units, each said unit comprising:

a horizontal mounting plate;

a pair of upper and lower support bars interconnected for relative vertical movement by front and rear links, the rear links being longer than the front links;

fasteners securing the upper support bar to the front portion of the lid whereby the rear of the lid may be raised relative to the truck bed;

clamp means on the mounting plate rearwardly of the lower support bar;

the clamp means removably attaching the mounting plate to one of the truck bed vertical flanges; and a rearwardly and upwardly extending gas spring removably interconnecting the horizontal mounting plate and the lid to support the rear end of the lid in a raised position relative to the truck bed.

2. The hinge system of claim 1 wherein the truck bed is formed with a pair of vertical stake bed pocket channel elements on the opposite front interior side portions of the bed, and the mounting plate is removably attached to one of the stake bed pocket channel elements.

3. The hinge system of claim 1 wherein the lid is secured to the upper support bars by longitudinally adjustable fastening means.

4. The hinge system of claim 2 wherein the mounting plate is attached to the stake bed pocket channel elements by fasteners disposed in longitudinally extending adjustment slots.

5. A hinge system for removably connecting a lid to the bed of a truck, such bed including a pair of vertical flanges disposed at opposite front sides of the interior of the truck bed, the hinge system including a pair of like hinge units, each said unit comprising:

a horizontal mounting plate;

a pair of upper and lower support bars interconnected for relative vertical movement by pivotally connected front and rear links;

fasteners securing the upper support bar to the front portion of the lid whereby the rear of the lid may be raised relative to the truck bed;

clamp means on the mounting plate rearwardly of the lower support bar for removably attaching the mounting plate to one of the truck bed vertical flanges;

a pair of gas spring units;

a lower gas spring mount on the rear portion of the mounting plate;

an upper gas spring mount on the intermediate portion of the lid; and the gas springs extending rearwardly and upwardly between the gas spring mounts to yieldingly support the rear end of the lid in a raised position relative to the bed.

6. The hinge system of claim 5 wherein the lid is secured to the mounting plate by longitudinally adjustable fastening means.

* * * * *